(12) United States Patent  
Ogawa

(10) Patent No.: US 6,776,207 B2
(45) Date of Patent: Aug. 17, 2004

(54) PNEUMATIC TIRE WITH BEAD REINFORCING LAYER ADJACENT BEAD FILLER

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/898,059

(22) Filed: Jul. 5, 2001

(65) Prior Publication Data

US 2002/0017352 A1 Feb. 14, 2002

(30) Foreign Application Priority Data

Jul. 5, 2000 (JP) ......................................... 2000-203301

(51) Int. Cl.$^7$ ........................... B60C 15/06; B60C 13/00
(52) U.S. Cl. ........................ 152/542; 152/539; 152/555
(58) Field of Search ............................... 152/542, 555, 152/543, 539

(56) References Cited

U.S. PATENT DOCUMENTS

| 3,044,522 | A | * | 7/1962 | Drakeford et al. | ...... 152/542 X |
| 3,800,844 | A | * | 4/1974 | Boileau | ...................... 152/555 |
| 3,904,463 | A | | 9/1975 | Boileau | |
| 5,529,104 | A | * | 6/1996 | Delias et al. | ........... 152/555 X |
| 6,360,799 | B1 | * | 3/2002 | Iwasaki | .................. 152/555 X |
| 6,443,204 | B1 | * | 9/2002 | Auxerre | .................. 152/542 X |

FOREIGN PATENT DOCUMENTS

| EP | 0 724 973 A1 | | 8/1996 | |
| EP | 1 083 065 A2 | * | 3/2001 | |
| EP | 1 129 870 A2 | | 9/2001 | |
| FR | 1.234.995 | * | 5/1960 | ................. 152/542 |
| JP | 62029403 A | * | 2/1987 | ................. 152/542 |
| JP | 2001018620 A | * | 1/2001 | |
| WO | WO-99/34991 A1 | * | 7/1999 | |

* cited by examiner

Primary Examiner—Adrienne C. Johnstone
(74) Attorney, Agent, or Firm—Sughrue Mion, PLLC

(57) ABSTRACT

A pneumatic tire comprises a bead portion, a carcass wound around a bead core having a polygonal form from an inside of a tire toward an outside thereof in a radial direction and a bead filler arranged on an outer periphery of the bead core, wherein a reinforcing layer comprised of an organic fiber cord(s) or a metal wire(s) extended substantially in a circumferential direction of the tire is arranged in a position adjacent to the bead filler.

3 Claims, 4 Drawing Sheets

PNEUMATIC TIRE WITH BEAD REINFORCING LAYER ADJACENT BEAD FILLER

BACKGROUND OF THE INVENTION

1. Field of the Invention

This invention relates to a pneumatic tire, and more particularly to an improvement of a bead portion in a pneumatic tire provided with a bead core having a polygonal form at its cross section.

2. Description of Related Art

In a bead portion of a heavy duty pneumatic tire, a portion of a carcass is wound around a bead core having, for example, a hexagonal form at its cross section from an inside of the tire toward an outside thereof in a radial direction and a bead filler is arranged above an outer periphery of the bead core between a main portion of the carcass and a turnup portion thereof. For the purpose of enhancing the rigidity of the bead portion and hence rigidities in all directions of the tire, it is widely and generally practiced to arrange at least one chafer made of nylon cords, steel wires or the like along the bead filler.

In the conventional chafer, a plurality of nylon cords, steel wires or the like are extended at a state of slightly inclining with respect to a phantom radial line segment viewed from a side face of the tire. Therefore, there is a problem that each nylon cord or the like, particularly an outer end thereof in the radial direction is easily peeled off from rubber during the repetitive rotation of the tire under loading, particularly due to the deflection deformation of the bead portion and sidewall portion.

And also, such a chafer is apt to easily cause the deformation, peeling or the like of the cord in the outer portion in the radial direction, which increases a size increasing quantity, accompanied with the increase of winding radius during the formation of a green tire, particularly at a shaping step thereof. As a result, the chafer is arranged only in the vicinity of the bead core. Furthermore, an extending angle of the nylon cord or the like and an arranging width of the chafer in the radial direction and the like are changed by the increase of the winding radius at the shaping step, and also an arranging density of the nylon cord or the like after the completion at the shaping step gradually decreases toward the outside of the chafer in the radial direction, so that it is difficult to give the rigidity to the bead portion as is expected.

SUMMARY OF THE INVENTION

It is, therefore, an object of the invention to solve the aforementioned problems of the conventional technique and to provide a pneumatic tire capable of sufficiently realizing a desirably adequate rigidity in a bead portion by eliminating a peeling fear of cord or the like and arranging cords or the like in required position and form as is expected in this type of reinforcing layer arranged along the bead filler.

According to the invention, there is the provision of in a pneumatic tire comprising a bead portion, a carcass wound around a bead core having a polygonal form at its cross section from an inside of a tire toward an outside thereof in a radial direction and a bead filler arranged on an outer periphery of the bead core between a main portion and a turnup portion of the carcass, an improvement wherein a reinforcing layer comprised of an organic fiber cord(s) or a metal wire(s) extended substantially in a circumferential direction of the tire is arranged in a position adjacent to the bead filler.

In the invention, the reinforcing layer is possible to have a structure that a plurality of circular rings each made of the organic fiber cord or the metal wire are arranged concentrically, but is preferable to have a spirally wound structure of one or more organic fiber cords or metal wires.

In the tire according to the invention, the organic fiber cord or the like constituting the reinforcing layer, for example monofilament cord or multi-filament cord is extended substantially in the circumferential direction of the tire, whereby the revelation of cord ends as described in the conventional technique can be prevented and also the peeling of these cord ends can effectively be prevented. This is particularly remarkable when the reinforcing layer has a concentrically arranging structure of plural rings or a spirally wound structure.

And also, the reinforcing layer comprised of the cord or the like extending substantially in the circumferential direction of the tire effectively contributes to increase the rigidity of the bead portion in various directions of the tire such as up and down directions and lateral direction and front and back directions. Particularly, the reinforcing layer can largely increase the rigidities in the lateral and front and rear directions of the tire among the above rigidities to ensure the realization of excellent steering stability and the like.

When the reinforcing layer has the spirally wound structure of one or more organic fiber cords or metal wires, it can simply be formed by spirally and continuously winding the cord or the like, and also such a wound form can easily be maintained. Therefore, the reinforcing layer can be simply, easily and accurately arranged in a given position of a green tire and hence a product tire without damaging the wound form of the cord or the like by sticking the reinforcing layer to a required position of the bead filler stood up on the bead core through adhesion or the like prior to the folding the turnup portion of the carcass, the sidewall portion and the like in the building of the tire, e.g. at the shaping step, or by setting the bead filler provided with the bead core and stuck on the required portion with the reinforcing layer at a given position in a stand-up posture. Thus, the rigidity of the bead portion can be increased as required, and also it is easy to incorporate such a bead portion rigidity in the design of the tire.

The reinforcing layer may be arranged in at least one of inner and outer faces of the bead filler. In this case, the reinforcing layer may be arranged over substantially a whole or a part of the bead filler in the radial direction or at given intervals in the radial direction of the bead filler.

BRIEF DESCRIPTION OF THE DRAWINGS

The invention will be described with reference to the accompanying drawings, wherein.

DETAILED DESCRIPTION OF THE INVENTION

Figure 1:
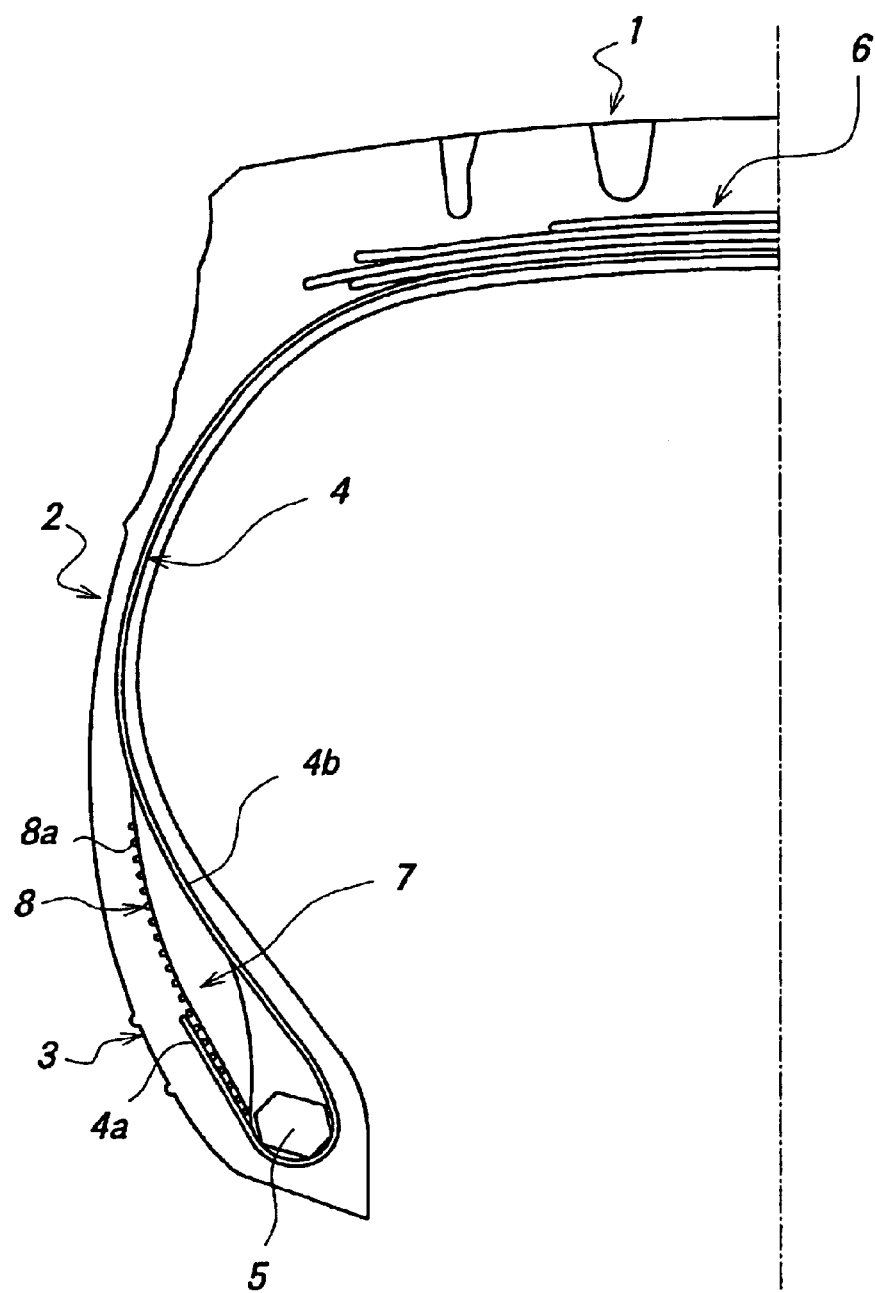
FIG. 1 is a diagrammatically right-half section view of an embodiment of the pneumatic tire according to the invention.

In FIG. 1 is sectionally shown a right-half of an embodiment of the heavy duty radial tire according to the invention, wherein numeral 1 is a tread portion, numeral 2 a sidewall portion extending inward from a side end of the tread portion 1 in a radial direction, numeral 3 a bead portion connecting to an inner peripheral side of the sidewall portion 2, and numeral 4 a carcass toroidally extending to reinforce these portions 1, 2 and 3.

In this embodiment, a turnup portion 4a of the carcass 4 is wound around a bead core 5 embedded in the bead portion 3 and having a hexagonal form at its section from an inside of the tire toward an outside thereof in the radial direction and fixed outward in the radial direction. And also, a belt 6 comprised of plural belt layers is arranged on an outer peripheral side of a crown portion of the carcass 4.

Further, a bead filler consisting of hard and soft rubber stocks is arranged on an outer peripheral side of the bead core 5 between a main portion 4b and a turnup portion 4a of the carcass 4. In the illustrated embodiment, a reinforcing layer 8 is adjoined to an outer face of the bead filler 7 and arranged over substantially a whole of the bead filler 7 in the radial direction. The reinforcing layer 8 is comprised of an organic fiber cord or a metal wire extended substantially in a circumferential direction of the tire.

It is favorable that the reinforcing layer 8 takes a spirally wound structure of one or more organic fiber cords 8a. In the reinforcing layer 8 having such a structure, cord end is revealed only at inner and outer ends of the spiral in the radial direction. Moreover, when the reinforcing layer 8 has a structure of concentrically arranging a plurality of circular rings having different diameters, each of which rings being formed by endlessly connecting the organic fiber cord 8a or the like in a circular form or by overlapping end portions of the organic fiber cord 8a or the like with each other in a circular form without connecting them, it is favorable to maintain the arranging state of these rings by connecting the plural rings to each other through a yarn or the like extending in the radial direction.

According to the tire having the above structure, the cord 8a or the like is extended substantially in the circumferential direction of the tire as mentioned above, so that the peeling of the cord end from rubber can advantageously be prevented and also the rigidity of the bead portion 3 in various directions can sufficiently be increased as required.

And also, the reinforcing layer 8 is stuck on a side face of the bead filler previously set or post-set in a given position at a stand-up posture prior to the folding of the turnup portion 4a of the carcass 4 and the like at a shaping step in the building of the tire, so that it can accurately be arranged in a given position of a green tire and hence a product tire at a desired state without being substantially influenced by the shaping step of subsequent folding operation or the like. As a result, the rigidity of the bead portion can simply, easily and properly be adjusted in a higher accuracy, or such a bead portion rigidity can be incorporated in the design of the tire.

Figure 2:
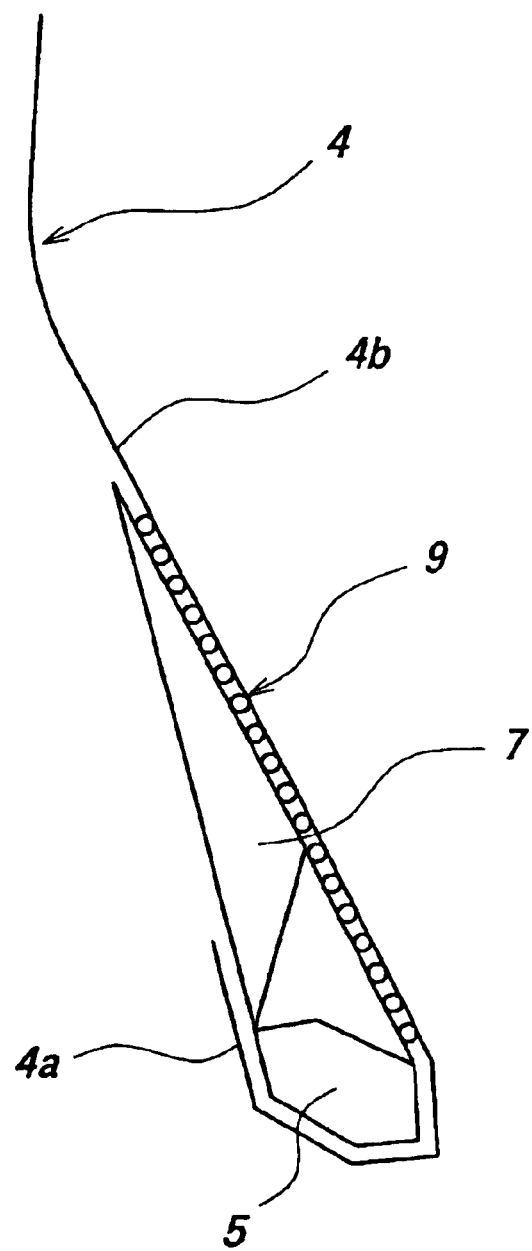
FIG. 2 is a schematically section view of a main part of another embodiment of the invention.

In FIG. 2 is sectionally shown a main part of another embodiment of the tire according to the invention, which is a modified embodiment of FIG. 1. That is, a reinforcing layer 9 is adjoined to an inner face of the bead filler and arranged over substantially a whole of the bead filler 7 in the radial direction.

Moreover, the rigidity of the bead portion can be more increased by arranging the reinforcing layers adjacent to both inner and outer faces of the bead filler 7 in a combination of, for example, the arrangement shown in FIG. 1 and the arrangement shown in FIG. 2.

Figure 3A:
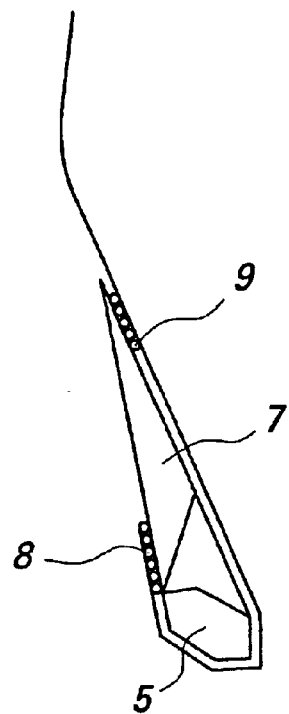
FIGS. 3a to 3c are schematically section views of main parts of the other embodiments of the invention, respectively.
Figure 3B:
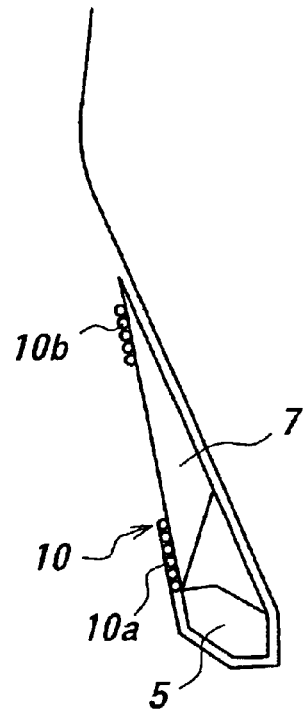
Figure 3C:
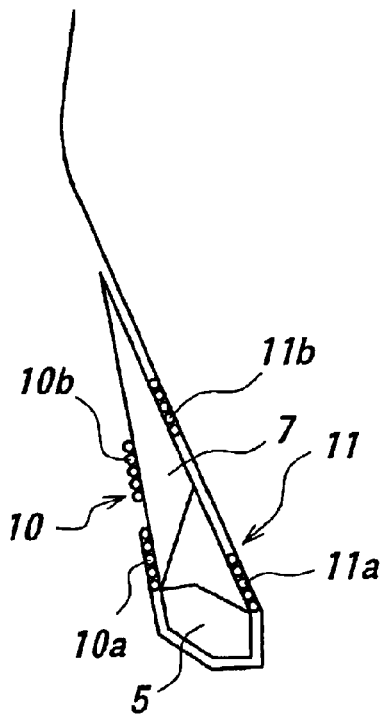

In FIGS. 3a to 3c are sectionally shown main parts of the other embodiments of the tire according to the invention, respectively.

An embodiment shown in FIG. 3a has a structure that the reinforcing layer 8 adjoining to the outer face of the bead filler 7 is arranged so as to be biased inward in the radial direction and the reinforcing layer 9 adjoining to the inner surface of the bead filler 7 is arranged so as to be biased outward in the radial direction. According to this structure, a given rigidity can be applied to any position and also distortion can be controlled by adjusting such a rigidity. Particularly, the cords of the reinforcing layer 9 are directly crossed with ply cords of the carcass to form paralleled crosses to thereby more increase the rigidity, while the reinforcing layer 8 directly control the bending deformation around a rim flange at the outside of the bead filler 7 to improve the bead portion durability.

An embodiment shown in FIG. 3b has a structure that a reinforcing layer 10 adjoining to the outer surface of the bead filler 7 is comprised of an inner peripheral segment 10a and an outer peripheral segment 10b arranged at a given interval in the radial direction of the bead filler 7. In this case, the distortion deformation can be more advantageously prevented by the outer peripheral segment 10b.

An embodiment shown in FIG. 3c has a structure that a reinforcing layer 11 adjoining to the inner surface of the bead filler 7 is comprised of an inner peripheral segment 11a and an outer peripheral segment 11b arranged at a given interval in the radial direction of the bead filler 7 in addition to the same reinforcing layer 10 as shown in FIG. 3b, wherein the interval between the segments in the reinforcing layer 11 is made larger than that in the reinforcing layer 10. According to the arrangements of the reinforcing layers 10 and 11, substantially the same function and effect as in FIG. 3b can be developed, but also the rigidity can be more increased by the paralleled crosses between the cords of the reinforcing layer 11 and poly cords of the carcass and also the bending deformation of the carcass can be restricted.

Even in the embodiments of FIGS. 3a to 3c, the same function and effects as shown in FIG. 1 can naturally be developed.

Figure 4:
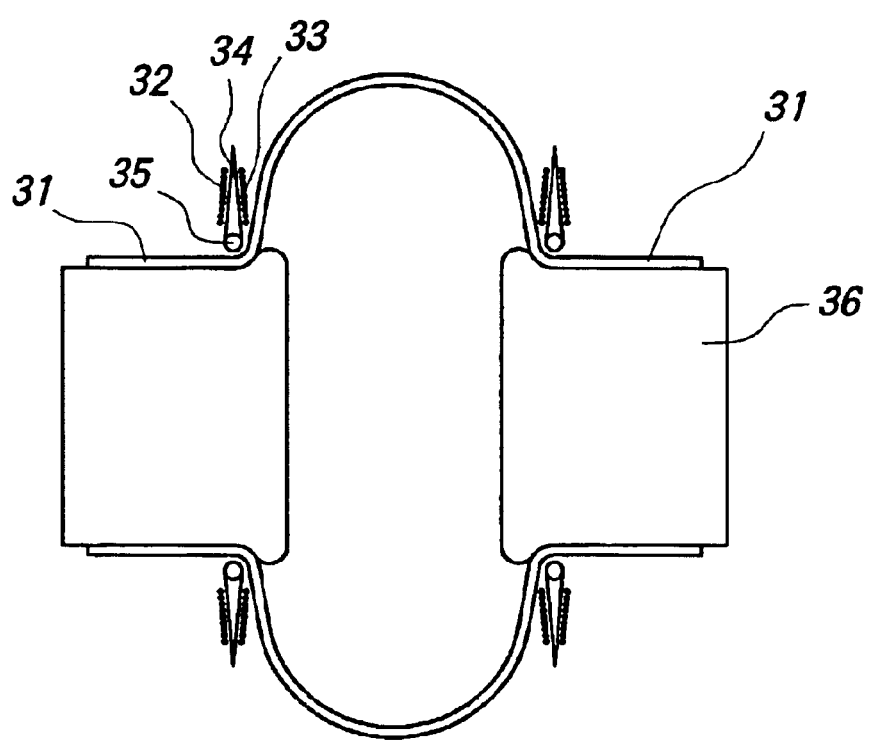
FIG. 4 is a schematically section view illustrating an embodiment of manufacturing the pneumatic tire according to the invention.

As sectionally shown in FIG. 4, the tire having the above structure can be manufactured by setting a bead filler 34 previously adhered with reinforcing layers 32, 33 in give positions at a stand-up posture together with a bead core 35 onto a given position of a former prior to the folding of portions 31 of the carcass, sidewall and the like at a shaping step in the building of the tire and thereafter continuing the shaping step such as the folding of the portions 31 to incorporate the reinforcing layers 32, 33 into a green tire.

The following example is given in illustration of the invention and is not intended as limitation thereof.

There are provided an example tire and a conventional tire having a tire size of 11R 22.5. In the example tire, a reinforcing layer formed by spirally winding an aramid fiber cord (1670 dtex/2) at a pitch of 1.5 mm is arranged as shown in FIG. 2. In the conventional tire, a wire chafer comprised of steel wires is arranged to extend inward and outward from an inner peripheral side of a bead core along an inner face of a carcass in the radial direction. With respect to these tires, up and down rigidity, lateral rigidity and front and back rigidity are measured by a static test of the tire to obtain results as shown in Table 1. Moreover, numerals in Table 1 are represented by an index on the basis that the conventional tire is 100, wherein the larger the index value, the higher the rigidity.

TABLE 1

|  | Conventional tire | Example tire |
|---|---|---|
| Up and down rigidity | 100 | 105 |
| Lateral rigidity | 100 | 126 |
| Front and back rigidity | 100 | 150 |

As seen from Table 1, the example tire can increase the rigidities in various directions, particularly lateral rigidity and front and back rigidity as required.

As mentioned above, according to the invention, the peeling of end portion of the cord or wire constituting the reinforcing layer can effectively be prevented to largely improve the bead portion durability, and also the rigidities of the bead portion in various directions can be adjusted simply and easily as expected.

What is claimed is:

1. A pneumatic tire comprising a bead portion, a carcass wound around a bead core having a polygonal form at its cross section from an inside of a tire toward an outside thereof in a radial direction and a bead filler arranged on an outer periphery of the bead core between a main portion and a turnup portion of the carcass, wherein at least two reinforcing layers each comprised of at least one organic fiber cord or at least one metal wire extended substantially in a circumferential direction of the tire are spaced apart in a position adjacent to the bead filler and in the radial direction of the bead filler.

2. A pneumatic tire according to claim 1, wherein each reinforcing layer is a spirally wound structure of one or more organic fiber cords or metal wires.

3. A pneumatic tire according to claim 1, wherein each reinforcing layer is arranged in at least one of inner and outer sides of the bead filler.

\* \* \* \* \*